Patented Jan. 3, 1950

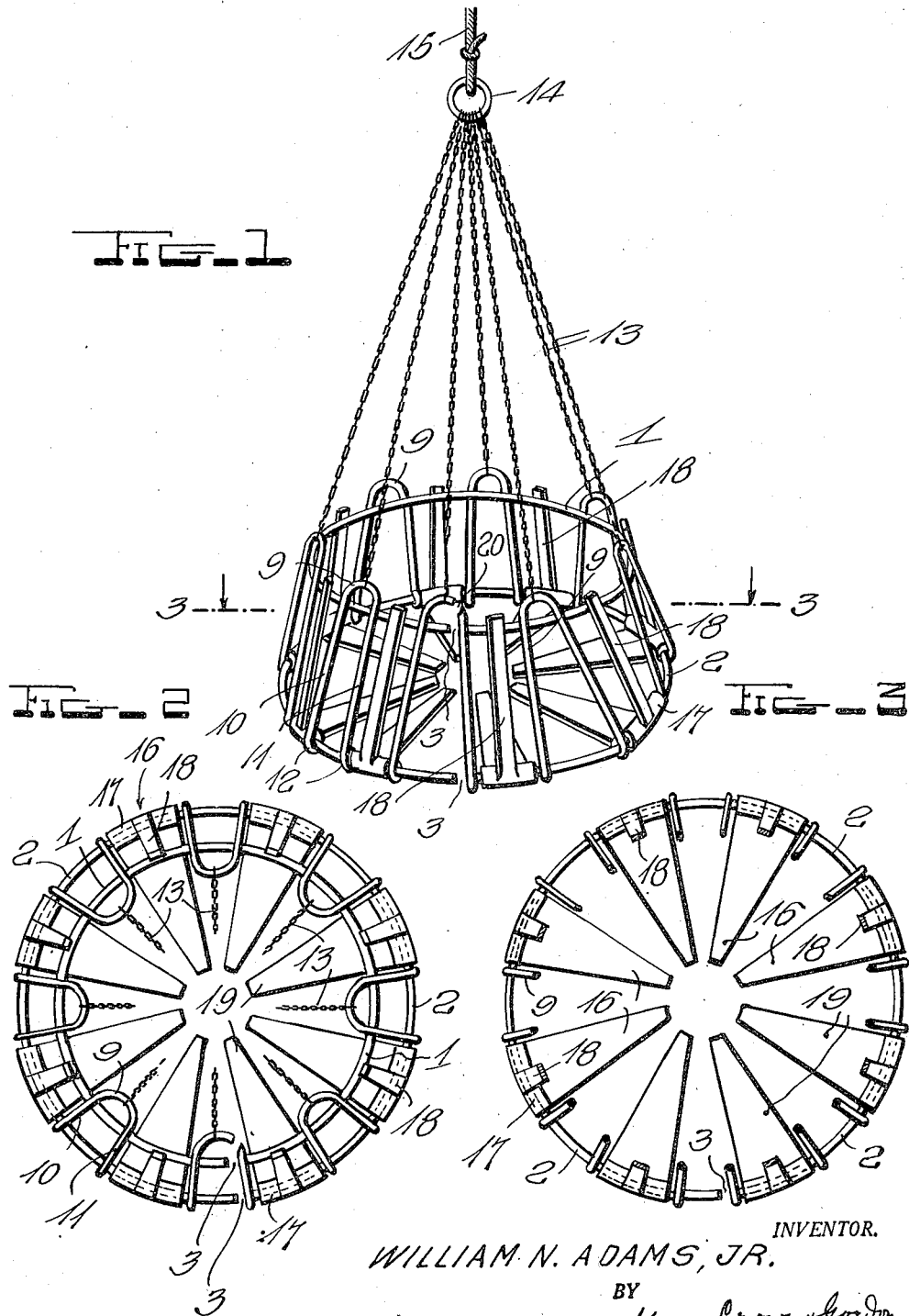

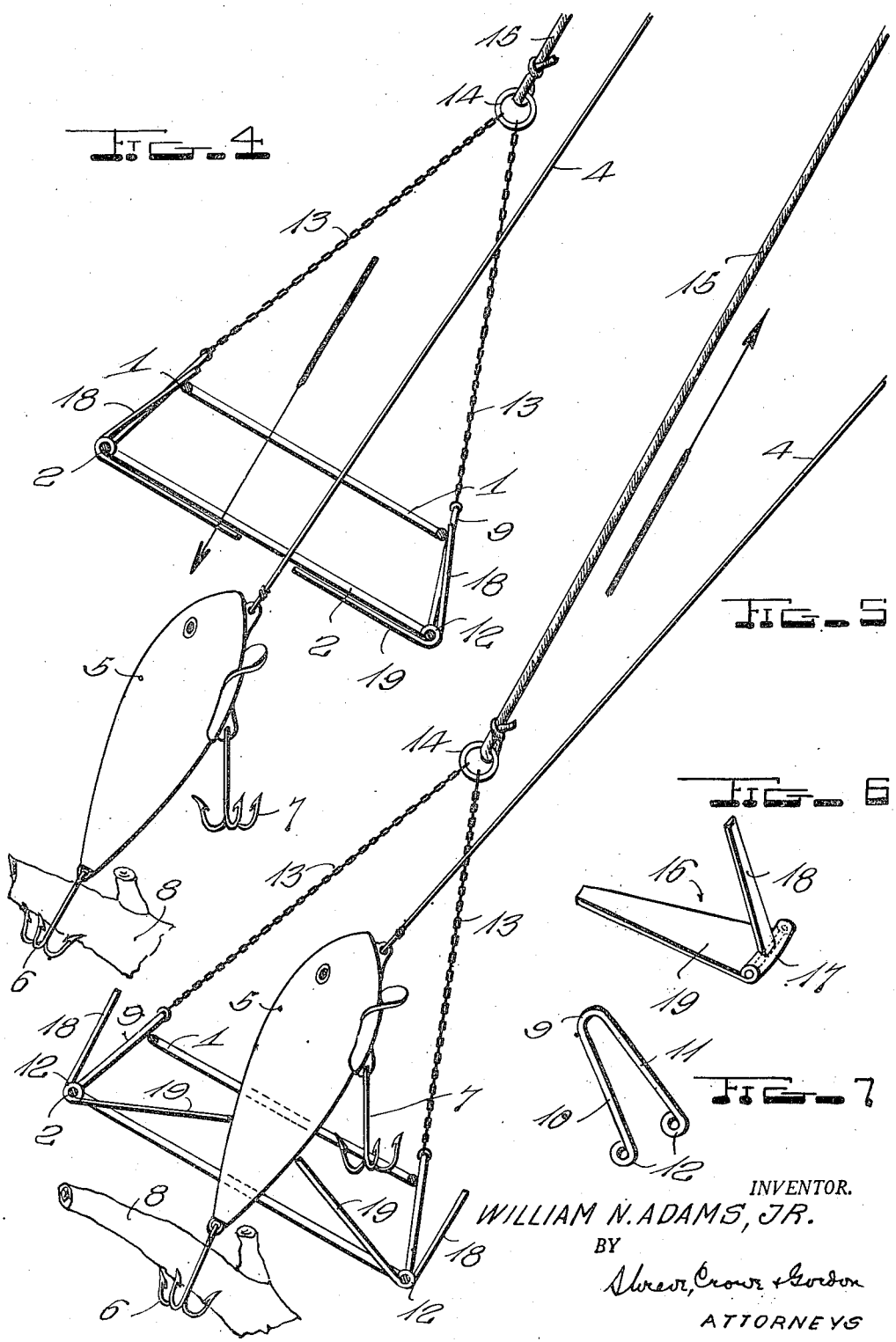

2,493,100

UNITED STATES PATENT OFFICE 2,493,100

FISHING PLUG RETRIEVER

William N. Adams, Jr., Decatur, Ga.

Application December 12, 1947, Serial No. 791,435

2 Claims. (Cl. 43—30)

The present invention relates to fishing appliances, and particularly to devices for severing plugs or lures from fishing hooks when snagged, and also for connecting an auxiliary line to a plug.

In the use of lures or plugs when trolling for fish, the hooks frequently become attached or snagged on sunken logs, seaweed and other fixed obstructions, too far beneath the surface to be released. In such cases, the fisherman must pull upon his line until it breaks, and such breaking frequently occurs above the plug, thereby resulting in the loss of the plug, which generally is of considerable value. On some other occasions, unusually large and heavy fish may be hooked which are too heavy to be raised by the ordinary trolling line.

Frequently the fishing hook to which the plug or lure is attached becomes snagged below the surface of the water, and in order to free the line, it ordinarily becomes necessary to break it, usually such breakage occurs above the plug and not infrequently above the water line, and not only causing the loss of the plug or lure but also a portion of the line, and, therefore, one of the principal objects of this invention is the provision of a retrieving device having means yieldable movable to permit downward movement of the device over the plug, and automatically movable into gripping engageable with the plug upon movement of the device in an upward direction to retrieve the plug and line.

One of the objects of the present invention is to provide a device or means so constructed as to permit it being lowered over the plug or lure and adapted upon movement of the device in raising direction to trip and grip the plug so as to forceably disengage it from the snared hook and retrieve it without breaking the line.

A further object of the invention is to provide a device of the above-indicated character which is thoroughly efficient for the desired purpose, yet which is simple in construction and sufficiently inexpensive to be a standard piece of equipment in any fisherman's kit.

Further objects and advantages of the present construction will become apparent as the description proceeds, and the features of novelty will be pointed out in particularity in the appended claims.

The invention will be understood more readily from a consideration of the accompanying drawings, wherein Fig. 1 is a perspective view of the improved device.

Fig. 2 is a plan view of the structure of Fig. 1, parts being broken away.

Fig. 3 is a sectional plan view of the structure of Fig. 1, taken on the line 3—3 looking in the direction of the arrows.

Fig. 4 is a diagrammatic view showing the device being lowered toward a snagged plug.

Fig. 5 is a diagrammatic view of the structure, the view indicating the engagement of the snared plug in the device during lifting movement of the device.

Fig. 6 is a detailed view of one of the gripping fingers of the present construction.

Fig. 7 is a detailed view of one of the suspension loops of the present improved construction.

Referring more particularly to the drawings, the device of the present invention comprises an annular cage-like frame formed of annular bars 1 and 2, the lower bar 2 having a diameter somewhat larger than the upper bar 1. These bars are composed of suitable metal, for example, a mild steel, and the continuity of these bars is interrupted as indicated at 3, to provide a space for the insertion, at any point throughout its length, of the fishing line 4 to which the plug or lure 5 is attached. The plug 5 carries hooks 6 and 7, the hook 6 being illustrated for purposes of this invention as being snagged on an obstruction 8. The annular bars 1 and 2 are held spaced by the suspension loop members 9 which are substantially U-shaped, with the sides 10 and 11 at their ends bent around the lower bar 2 as shown at 12, and being spot welded or otherwise secured to the upper bar 1. Said suspension members are uniformly spaced around the bars 1 and 2, and their loop ends are connected to suspension cables 13, which are attached to a ring 14 to which is suitably secured one end of an auxiliary line 15.

Hingedly or rotatably mounted on the lower annular bar 2 of the radially extending segmental clamping members 16 by the tubular bearing portions 17 from which project the upwardly and inwardly extending arms 18, and the heavier clamping portions 19 extending inwardly at angles with respect to said arms. Said arms 18 are adapted to seatingly engage the annular top bar 1 which acts as a stop for their inwardly turning movement, so that the clamping finger portions 19 will normally extend and be maintained in a horizontal plane. The members 16 are so designed that the finger portions 19 can move outwardly from the upper annular bar 1 as members 16 are rotated about the lower annular bar 2. This action permits the plug 5 to enter between the fingers 19 which yield under the weight of the device as it is lowered over the snagged plug along the fishing line 4. It will be observed that not only are the bars 1 and 2 interrupted in their continuity as indicated at 3, but also the adjacent suspension loop is interrupted adjacent to this break, as indicated at 20, so that registering openings are provided for the insertion of the fishing line 4.

When the plug 5 becomes snagged, the line 4 attached thereto is maintained taut and is inserted in the openings 3, and 20, and lowered until the fingers 19 engage the snagged plug 5. Further lowering movement causes the device to pass around the plug, the fingers 19 opening upwardly to permit the substantial or complete passage therethrough of the plug 5. The retrieving device being guided by the fishing line 4 is certain of proper engagement with the snagged plug, and passes over the customarily enlarged portions of the body of the plug, with the clamping fingers 19 following the contour of the body of the plug.

When the line 15 is pulled, the fingers 19 are engaged with the body of the plug, and clamp against the expanding portions thereof, as shown in Fig. 5, thereby gripping the plug, and if any breakage occurs in freeing the hook 6, such break will be at the hook beneath the plug, so that the plug and line attached thereto are retrived by simply hauling in the attached line.

It will be seen also that the device of the invention can be employed to handle any hooked fish that may closely approach or exceed the strength of the line 4. In such instances, the device is used in the same way as before, and the line 15, which preferably is substantially stouter than the line 4 may be used as an auxiliary line to lift such hooked fish. The device may be constructed of metal or other suitable material.

It will be apparent that while the illustrated embodiment of the device is shown as being substantially circular in cross section, it is not limited necessarily to such shape; nor are the suspension loops or gripping means for the plug necessarily of the shape shown. It will be understood therefore, that the embodiment of the invention herein described and claimed is in the nature of an illustrated embodiment only, and that the structural details thereof may be changed within the scope of the appended claims without departing from the spirit of the invention. It therefore will be understood that it is intended and desired to embrace within the scope of this invention such modifications and changes as may be necessary to adapt it to varying conditions and uses.

Having thus described the invention, what I desire protected by Letters Patent is as set forth in the following claims:

1. A fishing appliance comprising the combination with a fishing plug including a fish hook attached thereto, of a retriever coacting with the fishing plug and including an annular frame comprising upper and lower annular bars, a series of spaced suspension devices mounted on the lower bar and rigidly secured to the upper bar, a series of clamping elements rotatably mounted on the lower bar intermediate the suspension devices and including segmental shaped clamping fingers radially extending toward the vertical axis of the frame from the lower bar and angularly disposed arms for the clamping fingers, said arms being adapted to engage the upper bar to limit the downward movement of the clamping fingers, the clamping fingers being relatively separable interiorly of the frame to pass over the plug responsive to the lowering movement of the frame with corresponding movement of the said arms away from the upper frame bar, the clamping fingers shifting into clamping position against the plug responsive to the lifting movement of the frame, whereby the plug may be retrieved despite a snagging of the hook, and suspension cables attached to the suspension devices mounted on the frame for suspending the frame from a line.

2. A fishing device comprising a frame having upper and lower annular bars, a series of spaced suspension devices secured to the upper bar, a series of clamping elements rotatably mounted on the lower bar intermediate the suspension devices and including clamping fingers radially extending toward the vertical axis of the device from the lower bar, and angularly disposed arms for the clamping fingers, said arms being adapted to engage the upper bar to limit the downward movement of the clamping fingers, the clamping fingers being relatively separable interiorly of the frame to pass over a fishing plug responsive to the lowering movement of the frame with corresponding movement of the said arms away from the upper frame bar, the clamping fingers shifting into clamping position against the plug responsive to the lifting movement of the frame, whereby the plug may be retrieved despite a snagging of the hook, and suspension cables attached to the suspension devices mounted on the frame for suspending the frame from a line.

WILLIAM N. ADAMS, JR.

REFERENCES CITED

The following references are of record in the file of this patent:

UNITED STATES PATENTS

| Number | Name | Date |
|---|---|---|
| 637,208 | Hughes et al. | Nov. 14, 1899 |
| 882,796 | Pedigo | Mar. 24, 1908 |
| 1,042,630 | Wetmore | Oct. 29, 1912 |
| 1,542,099 | Rogers | June 16, 1925 |
| 2,083,062 | Hampton | June 8, 1937 |
| 2,175,757 | Metzler | Oct. 10, 1939 |
| 2,344,838 | Van Sickle | Mar. 21, 1944 |